United States Patent [19]

Abbott et al.

[11] 3,821,815

[45] June 28, 1974

[54] APPARATUS FOR BATCH-FABRICATING MAGNETIC FILM HEADS AND METHOD THEREFOR

[75] Inventors: Chester D. Abbott, Longmont; George W. Brock; Neil L. Robinson, both of Boulder; Frank B. Shelledy, Longmont; Sidney H. Smith, Broomfield, all of Colo.

[73] Assignee: International Business Machines Corporation, Armonk, N.Y.

[22] Filed: Oct. 11, 1972

[21] Appl. No.: 296,688

[52] U.S. Cl. ............360/110.2 C, 29/603, 51/281 R, 360/122

[51] Int. Cl. ........ G11b 5/12, G11b 5/42, G11b 5/46

[58] Field of Search ............ 179/100.2 C; 51/281 R, 51/165; 235/151.31; 29/603

[56] References Cited

UNITED STATES PATENTS

| | | | |
|---|---|---|---|
| 2,773,332 | 12/1956 | Buchman et al. | 51/281 R |
| 2,884,746 | 5/1959 | Rus et al. | 51/281 R |
| 3,486,220 | 12/1969 | Braun et al. | 179/100.2 C |

*Primary Examiner*—James W. Moffit
*Assistant Examiner*—Alfred H. Eddleman
*Attorney, Agent, or Firm*—Gunter A. Hauptman

[57] ABSTRACT

Magnetic heads formed of films deposited on a substrate are batch fabricated to extremely accurate throat heights by monitoring the electrical characteristics of films during material removal. A substrate carries a number of head elements each including a conductive film which serves as a drive and sense winding and also determines the gap width and throat height. The section of the conductive film which determines the throat height is initially made higher than necessary, and an additional conductor bridges two or more adjacent head elements. Leads, which normally connect the conductive film to read/write circuits, are monitored during a material removal process for electrical characteristic changes in the conductive film. For example, rough grinding progresses until the bridging conductor ruptures; and fine grinding then continues until the conductive film resistance reaches a predetermined value corresponding to the desired throat height.

10 Claims, 7 Drawing Figures

APPARATUS FOR BATCH-FABRICATING MAGNETIC FILM HEADS AND METHOD THEREFOR

BACKGROUND OF THE INVENTION

1. Field of the Invention

The invention relates to an apparatus and method for manufacturing magnetic heads.

2. Description of the Prior Art

High density magnetic writing and reading is possible with thin film batch-fabricated magnetic heads. In one form of such a head, shown for example in U.S. patent applications, Ser. No. 149,975, "Method and Apparatus for Testing Batch Fabricated Magnetic Heads During Manufacture Utilizing a Magnetic Field Generated by a Current Carrying Conductor," by Stephen M. Barrager and Sidney H. Smith, filed June 4, 1971, Ser. No. 149,976, "Method and Apparatus for Testing Batch Fabricated Magnetic Heads During Manufacture Utilizing Magnetic Fields Generated by Other Magnetic Heads," by Stephen M. Barrager, Geoffrey Bate, and Sidney H. Smith, filed June 4, 1971, and Ser. No. 296,742, "Internally Biased Magnetoresistive Magnetic Transducer," by George W. Brock and Frank B. Shelledy, filed Oct. 11, 1972, and assigned to the International Business Machines Corporation, one portion of a loop of conductive film is sandwiched between a horseshoe formed by two magnetic films. A magnetic-conductive-magnetic edge at the open end of the horseshoe is adjacent magnetic media during writing and reading. The single turn conductor, which is both the drive and sense "winding," has critical dimensions. Its thickness, which determines the head gap, must be extremely uniform and accurate. Similarly, the conductor's width under the horseshoe (usually called "throat height") critically effects the head's magnetic efficiency and heat-dissipating capacity.

The problem addressed here is how to accurately, repeatedly, and rapidly attain a predetermined optimum throat height. While a small throat height is obtained with a relatively narrow conductor, this necessarily involves relatively high resistance, high heat generation and a low heat dissipating volume. On the other hand, increasing the throat height decreases head efficiency in inverse proportion to the throat height. Therefore, for any one film head design, there will be a single optimum throat height giving maximum efficiency, minimum heat generation and adequate heat dissipation. In a practical manufacturing environment, this must be repeatedly attained in spite of the usual alignment errors, material irregularities, tool tolerances, run-in losses, temperature effects, etc.

The most apparent solution to the problem of controlling throat height during manufacture—direct measurement—is not available because the magnetic-conductive-magnetic or magnetoresistive films are encased in massive, supporting, and wear-resisting fixtures, quite early in the manufacturing process, which completely obscure the conductive film. Other prior art techniques are not adaptable to the special problems encountered here. For example, the IBM TECHNICAL DISCLOSURE BULLETIN, May, 1969, page 1792, in an article entitled "Alignment of Read-Write Heads in Sliders," by P. F. J. Landler, suggests monitoring the resistance of an extra conductor, surrounding a film head, during lapping until conduction is interrupted or becomes discontinuous. In addition to an extra conductor, this solution requires an extra set of external leads, difficult to justify in high density multi-element heads, and does not provide means for warning when the interruption will occur. While a rough warning can be obtained, as suggested in an article "Polishing Apparatus," by P. J. Grandison, published in the IBM TECHNICAL DISCLOSURE BULLETIN, Sept. 1970, page 1032, by monitoring the resistance of an extra conductor until current through that conductor is interrupted, the exact interruption point is difficult to predict by monitoring increasing resistance. Extra conductors and leads can be eliminated if, as suggested in an article entitled "Magnetic Head Having a Throat Height of Zero," by G. R. Hasler (IBM TECHNICAL DISCLOSURE BULLETIN, Oct. 1970, page 1323), voltages in two core windings are measured during grinding until the magnetic core circuit is interrupted. However, the technique is not applicable to a single turn film head not having provisions for extra windings.

While similar problems have been faced in other technologies, the solutions for those problems are not applicable to this film single turn magnetic heads either. For instance, accurately trimming a resistor deposited on a microminiature circuit substrate by measuring its resistance during abrasion is described in the IBM TECHNICAL DISCLOSURE BULLETIN, Feb. 1962, page 15, "Precision Resistor Manufacturing," by E. M. Hubacher, and U.S. Pat. No. 3,453,781 of J. M. Greenman III, assigned to the International Business Machines Corporation. Such techniques rely on detecting resistance changes over ranges many orders of magnitude greater than those detectable in a conductor.

SUMMARY OF THE INVENTION

A number of single turn conductor, inductive, or magnetoresistive (MR) thin film head elements deposited on a substrate are connected in groups by conductive bridges. Leads provide normal head operation to permit unusually accurate monitoring of electrical conduction by very simple circuits (1) through the bridges during fast rough grinding until a discontinuity occurs, and (2) through the single turn conductors during slower fine grinding. Thus, accurate throat height control is rapidly obtained, without overgrinding, uniformly for all elements. The point or bridge discontinuity need not be predictable, and the resistance measurements need be monitored only over a reasonably small range. Looked at another way, the bridges define apertures in the head elements. Automatic controls responsive to the monitored information direct throat height reduction by relative motion between the head and abrasive tape, grinding wheels, electrochemical techniques, etc. and other techniques for removing material by grinding, lapping, wearing, etc. While the invention is described with respect to single turn inductive and magnetoresistive heads, it nevertheless also encompasses any films sandwiched between supporting materials, multiturn heads, etc. In the case of multiturn heads, it is envisioned that only the portion of the conductor adjacent the head surface is effected by grinding and that the monitored electrical characteristic changes resulting from grinding will be less than that of a single turn head.

The foregoing and other features and advantages of the invention will be apparent from the following more particular description of a preferred embodiment of the invention, as illustrated in the accompanying drawings.

IN THE DRAWINGS

Figure 1:
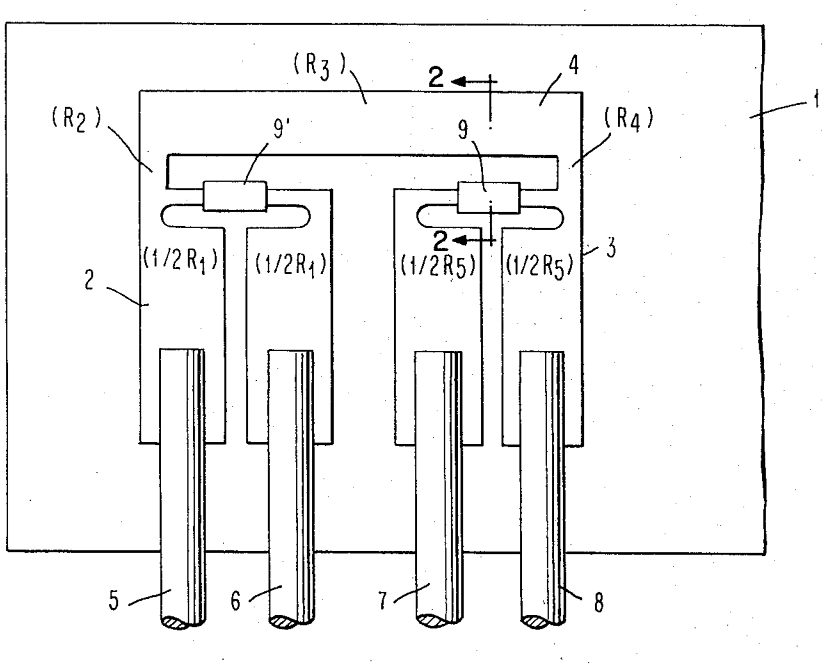
FIG. 1 shows a thin film magnetic head subassembly prior to throat height dimensioning in accordance with the invention.
Figure 3:
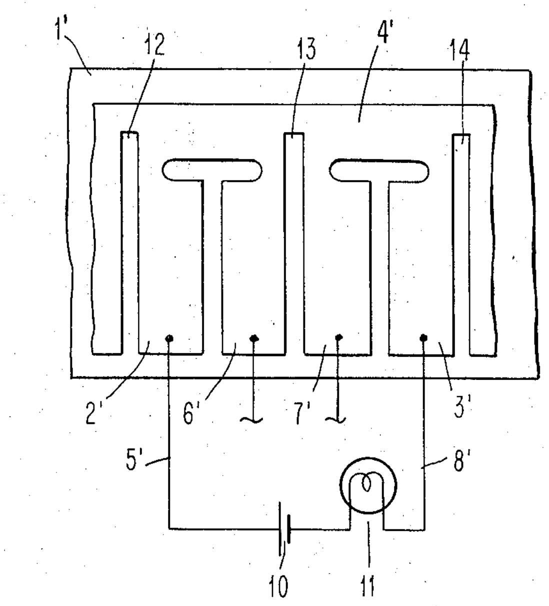

FIG. 3 schematically shows electrical connections that may be made to a modification of the head shown in FIG. 1.

Figure 4:
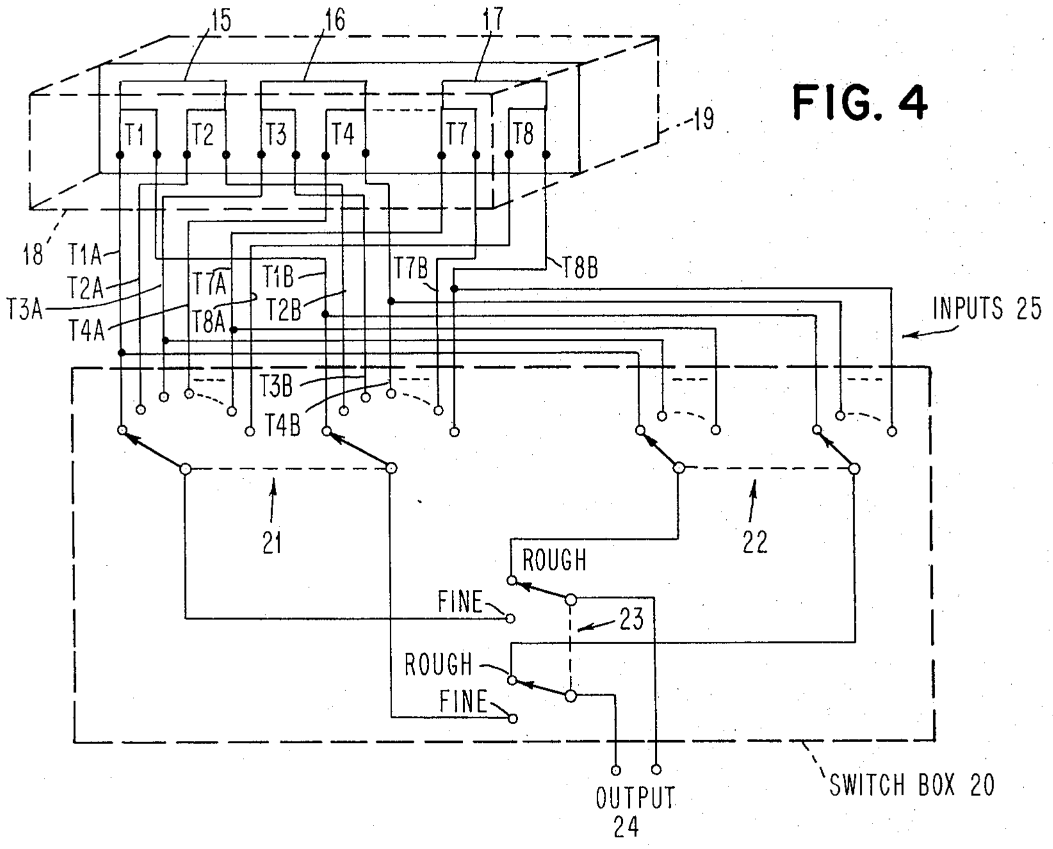

FIG. 4 is a schematic diagram showing the connection of a plurality of head elements to a switching device.

Figure 5:
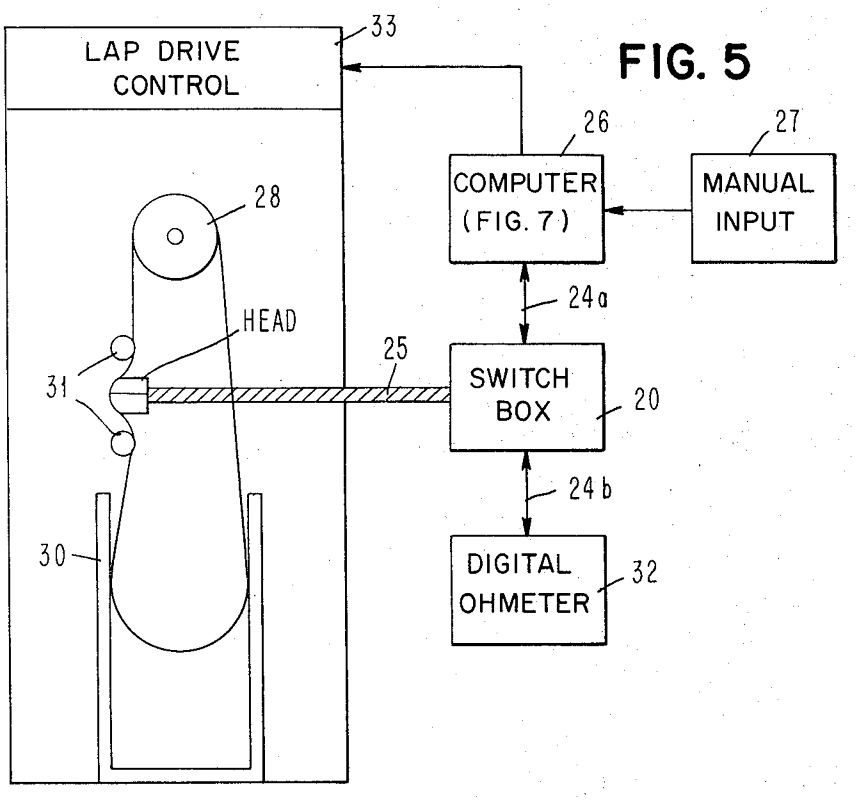

FIG. 5 is a line drawing showing one type of abrasive grinding machine usable for head throat height dimensioning.

Figure 6:
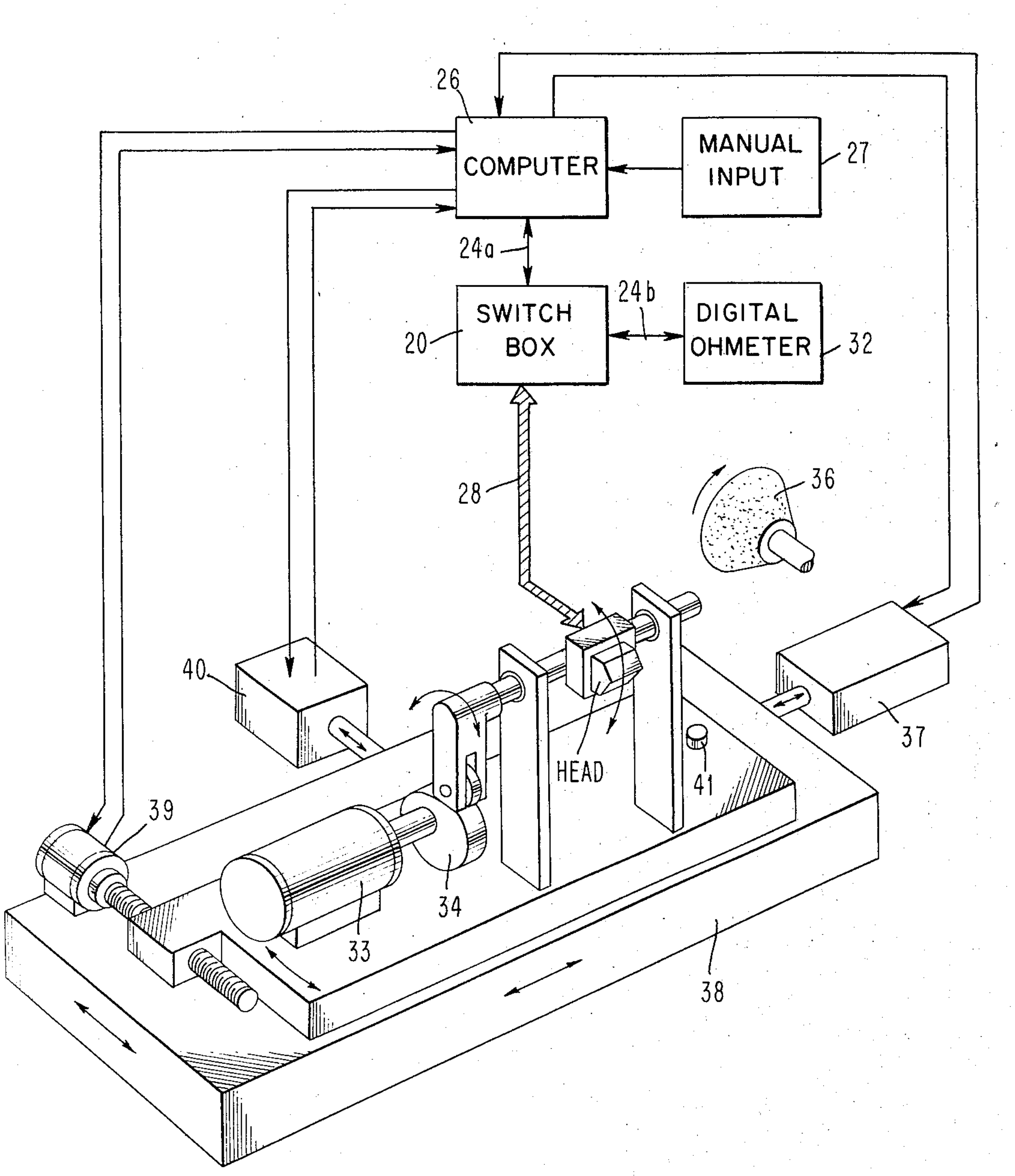

FIG. 6. shows another type of abrasive grinding machine.

Figure 7:
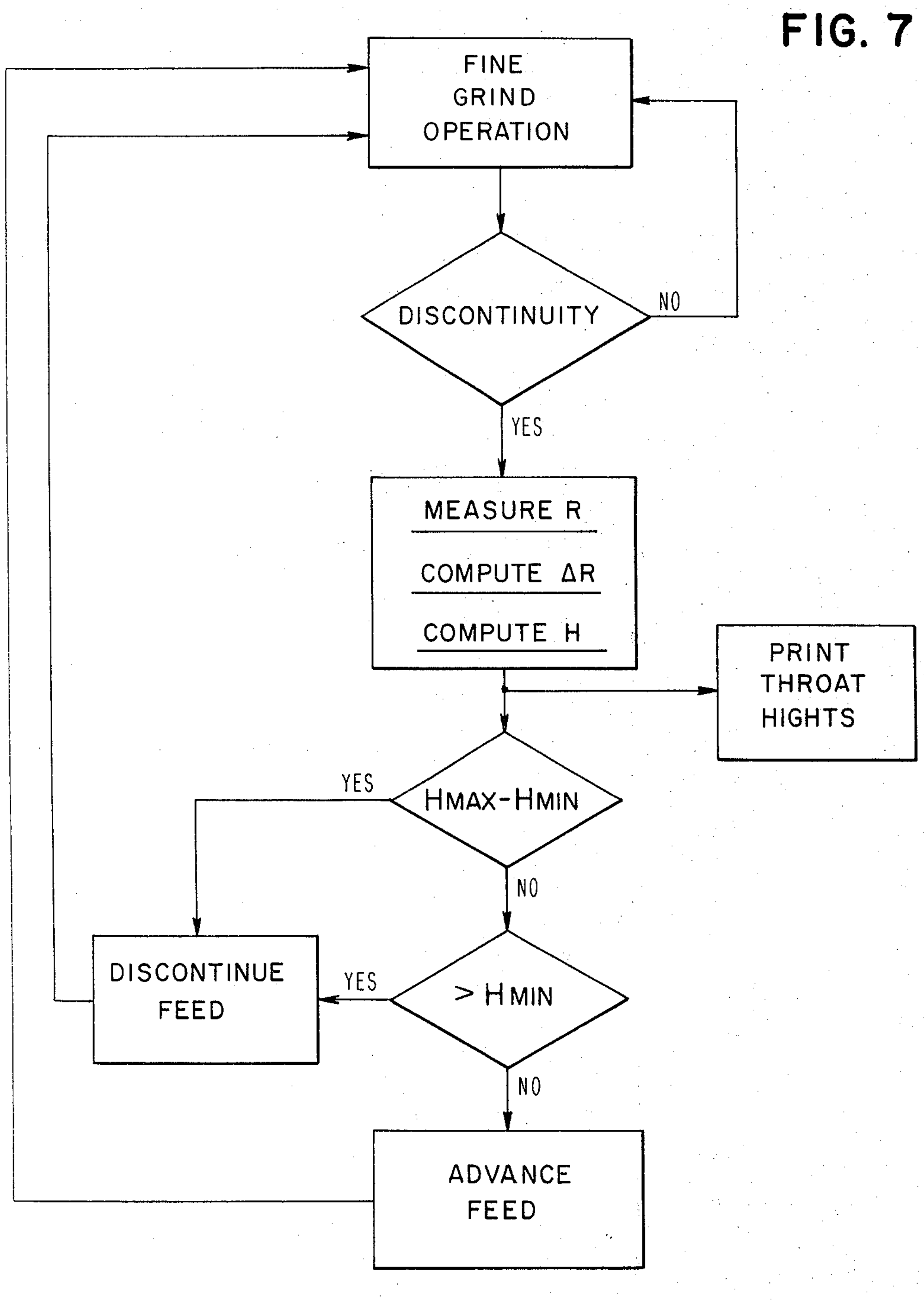

FIG. 7 is a flow diagram showing the operation of the computer of FIGS. 5 and 6.

There are two aspects to the invention; one, involving resistance measurement during fine grinding, will be explained with reference to FIGS. 1 and 2, and the other, involving the rupture of a bridge during rough grinding, will be explained with reference to FIG. 3. Both aspects are integral to the invention and must, as will be explained, be performed in a given order, not necessarily the order chosen here for explanation.

Referring first to FIG. 1, there is shown a substrate 1 carrying thin film head elements including conductive layers 2 and 3 connected by a bridge 4. The term conductive herein means substantially electrically conductive as opposed to completely insulating. Examples of conductors include copper and nickel-iron whose electrical characteristics (resistivity or conductivity) are given in Principles of Physics II – Electricity and Magnetism, F. W. Sears (Addison-Wesley, 1947), page 97 and Ferromagnetism, R. M. Bozorth (Van Nostrand, 1951), page 871. A magnetic path is closed around one side of each of the conductors 2 and 3 by magnetic yokes or closures 9′ and 9, respectively, to form a multitrack inductive head. The yokes may be omitted if the layers 2 and 3 are magnetoresistive and substrate 1 is nickel-iron, as explained in the cross-referenced patent application entitled "Internally Biased Magnetoresistive Magnetic Transducer," by George W. Brock and Frank B. Shelledy supra. The thin film head elements 2 and 3 are connected to external wires 5–8. Conductors 5, 6, 7, and 8 supply current to the elements 2 and 3 and the bridge 4. For example, current from conductors 5 and 8 flows in a circuit having a total resistance $(R1/2) + R2 + R3 + R4 + (R5/2)$.

Figure 2:
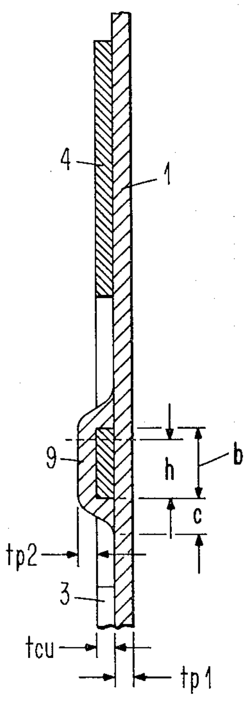
FIG. 2 is a cross-section of the head of FIG. 1 taken at line 2—2.

A cross-section through line 2—2 of FIG. 1 appears in FIG. 2. A magnetic material such as Permalloy forms a horseshoe, comprising layers 1 and 9, around a portion of the conductor 3. The magnetic layers 1 and 9 have a cross-section, $tp2$ and $tp2$ respectively, and the conductive film 3, which is preferably copper, has a thickness $tcu$. The height of the conductive member 3, defined as the throat height, falls between a starting height b and a final desired height $h$. During manufacture of a head element, material is removed by fine grinding to achieve the throat height $h$. Given a means for measuring the resistance of the material during manufacture, there is a correlation between the measured change in resistance ΔR and the throat height $h$. For example, if an ohmmeter (which usually senses current to measure resistance is connected across leads 5 and 6 to measure the resistance R1 of element 2, the measured resistance change ΔR during manufacture will be:

$$\Delta R = R1 \frac{(b-h)(\alpha tcu + tp1 + tp2)}{h(\alpha tcu + tp1 + tp2) + c(tp1 + tp2)}$$

The quantities in the equation are defined as follows:

$h$: throat height
$b$: initial throat height
$c$: closure height
$tcu$, $tp1$, $tp2$: thickness of the layers as shown in FIG. 2
$\alpha$: ratio of the resistivity of the materials used in the layers [that is ($\rho$ Permalloy/$\rho$ Cu)]
R1: initial resistance when $h=b$ In a stable manufacturing process, all of the terms except ΔR and h are known and constant. Therefore, ΔR is a reliable indicator of the throat height h and the change of resistance during grinding becomes a function of the throat height alone.

Referring to FIG. 3, a modification of the head subassembly of FIGS. 1 and 2 illustrates that many other heads may be manufactured in accordance with the invention. In FIG. 3, the elements 1′–8′ correspond to the elements 1–8 in FIGS. 1 and 2. Magnetic yokes or closures are not necessarily used for magnetoresistive heads and, while they are essential for other types of heads, are omitted for simplicity of explanation. In addition, FIG. 3 illustrates another aspect of the invention; the use of the bridging element 4′. A source of potential 10 is connected in series with an indicator 11 to sense continuity in the circuit including the elements 2′ and 3′ and the bridge 4′. As rough grinding progresses, the slot 13 will be reached causing a break in the bridging circuit 4′ indicating that the grinding has progressed to a predetermined point defined by the top of the slot 13. The indicator circuit may be connected to other points on the head if a rupture in the bridging element over a larger distance (for example, by slots 12 and 14) is desired.

From the foregoing description of FIGS. 1–3, it will be understood that progressive grinding may indicate roughly the progress of the manufacturing operation followed by a finer monitoring of the grinding operation. Thus, a rough grinding operation may progress until the continuity in the bridge 4 or 4′ is broken as indicated by, for example, the indicator 11 in FIG. 3. Thereafter, a fine grind may progress with an ohmmeter monitoring the change in resistance to indicate when the desired throat height h has been reached as explained with reference to FIGS. 1 and 2.

Referring now to FIG. 4, a typical batch fabricated thin film magnetic head is schematically illustrated in connection with a circuit 20 enabling monitoring during grinding. Such heads normally contain more than one element, one element being commonly provided for each track on a media such as a tape. For example, in FIG. 4, eight tracks are served by eight head elements T1–T8, of which three (15, 16 and 17) are shown, each interconnected by a bridge to an adjacent element. It will be understood that any number of elements may be provided and that the bridges need not necessarily span adjacent pairs. For example, if an odd number of tracks are required, a bridge may be omitted or provided for a single element only. Depending on the type of head being made, the elements are encased in an appropriate material, such as, for example, ferrite blocks 18 and 19, in a manner well known in the art. During grinding operations, it is economically and technically desirable to monitor all elements T1–T8 with a single sensing device. This is made possible by a switch box 20 which is capable of interconnecting the element line inputs T1*a*, T1*b*, T2*a*, etc., to an output 24. The switch box consists of scanning switches 21 and 22 which may be rotated to sequentially scan a single head element and a single bridge, respectively. The switch box rotary switches 21 and 22 are schematic representations which may be embodied in the form of mechanical switches, electronic switches, electronic logic, pneumatic logic, etc. The bridge scanned by the switch 22 is connected to the output 24 when switch 23 indicates a rough grinding operation requiring that the existence of continuity be sensed. When a lack of continuity is sensed, switch 23 is placed in the "fine" position, and switch 21 supplies to the output 24 connections to each element in turn to permit sensing of changes in resistance by appropriate instruments connected to the output 24. When the change in resistance equals a predetermined amount as detected by additional instrumentation, all grinding is halted.

A typical control for a grinder useful in both rough and fine grinding is shown in FIG. 5 and a modification showing a different type of grinder is shown in FIG. 6. It will be understood that the two operations may also be performed on different grinders; for example, the grinder of FIG. 6 may be used for rough grinding and the grinder of FIG. 5 for fine grinding. Referring first to FIG. 5, the head is mounted mechanically in place and electrically connected to switch box 20 by cable 25. The switch box output 24 is supplied to a computer 26 by line 24*a* and to ohmmeter 32 by line 24*b*. The computer may typically be any analog or digital computer; for example, the IBM 1,800 computer is especially adaptable for use in this system. The ohmmeter may be any ohmmeter with an intervening analog to digital converter, or an ohmmeter manufactured by Keithley which incorporates analog to digital conversion may be used. The computer 26 is connected to a manual input 27 for supplying the necessary equations previously described plus the reference values required for recognizing when the desired change in resistance has been achieved. The grinding operation progresses as the lap drive control 33 directs a motor-driven spindle 28 which rotates a loop of abrasive tape 29, for example at one speed for rough grinding and another for fine, held against the tape head by free wheeling rollers 31. The head may be adjusted in any of two or three axes in order to provide uniform material removal and compensation for fabrication tolerances. Thus, if the rough grinding operation does not progress evenly, or if the head was inaccurately assembled or placed into the grinding fixture, discontinuities will occur causing one bridge to rupture before the other bridge. This irregularity may be adjusted prior to the beginning of fine grinding by realigning the axis of the tape head. Similarly, during fine grinding, uneven material removal (indicated by different resistances) may be compensated for by mechanical readjustment of the tape head orientation.

During rough grinding, the bridge network between the adjoining tracks is monitored for continuity through the switch box 20 and the computer 26. As the rough grinding continues and the bridge network between the tracks opens, each opening is detected by the computer 26. When a desired number of bridges break, the computer 26 signals the lap drive control 32 to terminate the rough grind operation. This may involve a lower speed of operation of the spindle 28 or may require an operator to replace the abrasive tape with a finer abrasive compound. Thereafter, a finish contour grind is established. During this grinding operation, the resistance of all tracks is monitored by the ohmmeter 32 and compared with a resistance value, which may be entered into the computer 26 by the manual input 27. If desired, the information from the computer may be printed on an external printer and monitored during grinding by an operator. It has been noted during grinding operations that outside head tracks tend to vary in throat height to a different degree than inner tracks, requiring readjustment of the head orientation with reference to the lapping tape. When the resistance measured by the ohmmeter 32 reaches the value previously indicated to the computer 26, the lap drive control 33 is signaled to terminate the grinding operation.

Referring now to FIG. 6, there is shown a variation of the grinding tool shown in FIG. 5. The tool consists of a rotating grinding wheel in contact with the head which is oscillated back and forth by a motor 33 driving a cam 34 attached to an arm 35. The position of the head is adjusted by a table index 40 and a table drive 37 as well as a pivot motor 39 which turns the head on a pivot 41. The switch box 20 is connected to the computer 26 and ohmmeter 32 as previously described, and the grinding operation proceeds in the same manner as before. The grinding wheel 36 is a cupped wheel manufactured of powdered diamond or similar material. The radius on the head is generated by the cup wheel partially under control of the cam 34 oscillation.

The operation of the computer 26 will now be described with reference to the flow diagram of FIG. 7. Assuming that rough grinding has indicated a discontinuity, the fine grind operation progresses by measuring the actual resistance of the elements one at a time. The flow diagram of FIG. 7 shows the operations present during the measurement of each head element, it being understood that the same routine applies to each element taken in sequence. The fine grinding operation progresses with the ohmmeter measuring the resistance in the element, and the computer computing the change in resistance from the previous measurement and then determining from that the throat height. The throat height may be printed externally and is compared by the computer with the previously stored range of maximum and minimum throat heights. If the computed throat height h does not fall within the previously determined range of throat heights and is less than the minimum desired throat height, the feed is advanced on the grinding mechanism and further grinding occurs. If the computed throat height equals or exceeds a value within the desired range, feed is discontinued.

While the invention has been particularly shown and described with reference to preferred embodiments thereof, it will be understood by those skilled in the art that various changes in form and details may be made therein without departing from the spirit and scope of the invention.

What is claimed is:

1. A method for accurately obtaining a desired throat height, of a batch-fabricated magnetic head deposited as a film on a supporting substrate, of a type having a set of leads, comprising the steps of:

monitoring an electrical characteristic of a first head portion, deposited on a substrate to one side of the head, through a number of said leads;

monitoring an electrical characteristic of a second head portion, deposited on the substrate between the head and the first head portion, through a number of said leads;

removing material, starting on aforesaid one side of the head, at a first rate until the monitored electrical characteristic of the first head portion becomes discontinuous; and removing further material at a second rate until the monitored electrical characteristic of the second head portion equals a predetermined finite quantity.

2. The method of claim 1 wherein each magnetic head comprises a plurality of two-lead windings, each said second head portion is formed by one side of a winding and said first head portion bridges a number of adjacent windings, the method comprising the additional step of:

initially selecting for monitoring, in connection with material removal, each first portion in turn to assure even removal of material across the entire head; and subsequently selecting for monitoring, in connection with further material removal, each second portion in turn to assure even removal of material across the entire head.

3. The method of claim 2 wherein the material is removed by relative motion between the head and abrasive material secured to a solid base material.

4. Means for simultaneously obtaining an accurate desired dimension during manufacture of a plurality of magnetic head elements, each deposited as films on a single substrate, wherein each element includes a multisided substantially conductive film portion, comprising:

first additional material deposited as a film on said substrate on a first side of each conductive film portion, extending the conductive film portion in excess of that required for a predetermined desired dimension;

second additional material, deposited as a film on said substrate near the first side of each conductive film portion and including a number of slots along at least one side of each extended conductive film portion;

monitoring means connected to each film portion for measuring electrical characteristics of the film portions and the first and second additional materials and supplying manifestations thereof;

material removal means operable at a first rough removal rate and a second fine removal rate to remove said first and second additional material in order; and control means connected to said monitoring and material removal means for initially causing said material removal means to operate at a first rate of removal; responsive to manifestations from the monitoring means indicating discontinuity in the electrical characteristic of the first additional material to cause said material removal means to operate at the second removal rate; and responsive to manifestations from the monitoring means indicating a predetermined value of electrical characteristic of the second additional material to cause termination of material removal by said material removal means.

5. The means of claim 4 wherein the electrical characteristic monitored is resistance, and the material removal means comprises particles, harder than the head materials, mounted on a carrier.

6. The process of forming a magnetic head by subtractively machining one surface of a nonconductive substrate carrying a number of magnetic and conductive layers, at least one layer including first and second portions electrically connectable through leads to external monitoring apparatus, comprising the steps of:

first, machining the head at a first rate while monitoring the electrical current through the first portion;

second, terminating machining at the first rate when electrical current no longer flows through the first portion;

third, machining the head at a second rate, slower than the first rate while monitoring the electrical current through the second portion; and fourth, terminating machining when electrical current through the second portion substantially equals a predetermined value.

7. A magnetic head subassembly manufacturing system used during manufacture of a complete multi-track magnetic head, including:

first conductive means, each defining a head track;

second conductive means, adjacent all said first conductive means and connected thereto at selected points;

first monitoring means, operable to sense the value of an electric current;

second monitoring means, operable to sense the presence or absence of an electric current;

switching means interconnecting the first conductive and the first monitoring means and interconnecting the second conductive and the second monitoring means;

grinding means capable of being placed in contact with said conductive means, operable in two modes to subtractively remove material from the second and first conductive means, in that order; and control means, connected to the monitoring, switching and grinding means, operable to initiate grinding in a first mode, operable in response to the second monitoring means sensing the absence of an electrical current to cause said grinding means to change to said second mode and operable in response to the first monitoring means sensing a predetermined value to terminate grinding.

8. A magnetic head subassembly including materials intended for removal during manufacture of a complete head, comprising:

a plurality of conductive elements arranged substantially along one side of a line defining a head surface, portions extending across the line being removed during manufacture;

a plurality of conductive bridges to be removed during manufacture, arranged along the other side of aforesaid line, connected with the conductive elements at selected points of said portions extending across said line; and connectors, for providing electrical connections to all the elements and bridges, solely through the element.

9. The subassembly of claim 8 wherein each element is connected to at least one bridge.

10. The subassembly of claim 9 wherein magnetic pole pieces encompass a portion of each conductive element substantially along one side of said line, portions extending across the line being removed during manufacture.

* * * * *